(12) United States Patent
Hoover et al.

(10) Patent No.: US 10,921,174 B2
(45) Date of Patent: Feb. 16, 2021

(54) HYDROCARBON TRANSFER STANDARD CERTIFIED TO PROVIDE IN SITU CALIBRATION OF MEASURING DEVICES

(71) Applicant: Endress+Hauser Inc., Greenwood, IN (US)

(72) Inventors: Brian Hoover, Fishers, IN (US); Christopher Brent Miller, Martinsville, IN (US); Ron Onwezen, Cove, OR (US)

(73) Assignee: Endress+Hauser Group Services AG, Reinach (CH)

( * ) Notice: Subject to any disclaimer, the term of this patent is extended or adjusted under 35 U.S.C. 154(b) by 491 days.

(21) Appl. No.: 15/605,562

(22) Filed: May 25, 2017

(65) Prior Publication Data

US 2018/0340815 A1    Nov. 29, 2018

(51) Int. Cl.
*G01F 25/00* (2006.01)
(52) U.S. Cl.
CPC ........ *G01F 25/0007* (2013.01); *G01F 25/003* (2013.01)
(58) Field of Classification Search
CPC .................................................. G01F 25/0007
USPC ......................................................... 73/1.16
See application file for complete search history.

(56) References Cited

U.S. PATENT DOCUMENTS

| 2015/0226597 | A1* | 8/2015 | Gaspard, Jr. | ........ G01F 25/0007 73/1.16 |
| 2016/0245541 | A1* | 8/2016 | Karamanos | .......... G05D 7/0635 |
| 2018/0299320 | A1* | 10/2018 | Bhatasana | ........... G01F 25/0015 |
| 2019/0003875 | A1* | 1/2019 | Natter | ................... G01F 1/8436 |

FOREIGN PATENT DOCUMENTS

| WO | 0167052 A1 | 9/2001 |
| WO | 2016059132 A1 | 4/2016 |

OTHER PUBLICATIONS

"Positive Displacement Meters." Master Meter, Inc. Published 2008. (Year: 2008).*
Mobile In-Line Flow Meter Calibration Rig, http://www.insatechpharma.com/solutions/calibration/flow-calibration-rig, last accessed Jan. 13, 2017, 4 pp.

* cited by examiner

*Primary Examiner* — Walter L Lindsay, Jr.
*Assistant Examiner* — Philipmarcus T Fadul
(74) *Attorney, Agent, or Firm* — Christopher R. Powers; Endress+Hauser (USA) Holding Inc.

(57) ABSTRACT

One aspect of the present disclosure includes a transfer standard apparatus for in situ calibration of measuring devices including a manifold having a first header in fluid communication with a second header via two or more flow lines, the first header and the second header each having ports at each end structured to accept external flow lines, two or more flow meters, each disposed in one of the flow lines such that the flow meters are connected in parallel relative to the first header and second header, and valves disposed in the flow lines adjacent the first header and the second header and operable to selectively isolate each flow meter from the first header and the second header. The transfer standard apparatus may include a mobile platform on which the manifold is mounted, including access to the ports of the first header and second header.

17 Claims, 4 Drawing Sheets

HYDROCARBON TRANSFER STANDARD CERTIFIED TO PROVIDE IN SITU CALIBRATION OF MEASURING DEVICES

TECHNICAL FIELD

The present disclosure generally relates to transfer standards for the calibration of measuring devices, in particular, in situ calibration.

BACKGROUND

A transfer standard is an instrument, device or apparatus which, together with associated operational procedures, is capable of accurately reproducing standard values that are quantitatively related to a higher level and more authoritative standard. A transfer standard's purpose is to transfer the authority of higher authority (i.e., higher level) standard to a remote location, where the transfer standard is used to verify or calibrate a measuring device. When the device to be calibrated is located at a remote site, it is necessary to use a transfer standard that is traceable to a more authoritative standard. Such a remote location may be any location separate from the site of the higher authority standard. For example, the remote site may be production facility employing the target device, commonly referred to as the equipment under test (EUT). In operation, a transfer standard is first precisely related to a standard at least one level above the transfer standard, which may then be transported to the remote site of the device to be calibrated where it is used to calibrate the device.

Traceability is the property of a measurement result whereby the result can be related to a stated reference through a documented unbroken chain of calibrations, each contributing to the measurement uncertainty. Transfer standards must be applied in a manner that will ensure a specified level of measurement uncertainty and traceability. A significant aspect of the use of a transfer standard is the need to determine and prove that it has adequate repeatability and reliability under the conditions of use.

The calibration and certification of measuring devices that have been employed in the field (i.e., a remote site) pose challenges. The cost and lost productivity are significant where a measuring device must be removed from a process or plant to be sent away for calibration and certification. In such cases, a process may need to be shut down and then must be restart once the metering device is reinstalled, both procedures and the downtime are cost intensive. Moreover, a measuring device that has been removed from its intended process to be calibrated in a laboratory is generally not calibrated under the same conditions and with the same process medium as in its intended application.

Conventionally, measuring devices in the field may be verified and/or calibrated using a prover, which passes a known volume of a medium (e.g., liquid or gas) through the EUT to compare with a measurement of the EUT. There are various types of provers, including ball or pipe provers, small volume provers, volumetric tank provers and gravimetric tank provers. Each has its advantages and disadvantages relative to one another. For example, ball or pipe provers may have lower initial costs but may expose workers to the medium of the process, require a sizable footprint that makes portability impractical in many cases, may require considerable maintenance, may require large volumes of the medium, and can be sensitive to temperature and pressure variation. As a further example, small volume provers, while relatively portable, may be slow due to their fixed volumes, are susceptible to damage from media contaminated with abrasive debris, are not suitable for gas flows and are relatively complex, raising reliability concerns.

Accordingly, there remains a need for further contributions in this area of technology.

BRIEF SUMMARY

One aspect of the present disclosure includes a transfer standard apparatus for in situ calibration of measuring devices. The apparatus includes a manifold, which includes a first header in fluid communication with a second header via two or more flow lines, the first header and the second header each having ports at each end, the ports structured to enable external flow lines to be connected to the first header and the second header, two or more flow meters, each having a flow capacity and disposed in one of the two or more flow lines such that the flow meters are connected in parallel relative to the first header and second header, wherein at least one of the flow meters has a lesser flow capacity than the other flow meters, and valves disposed in the flow lines adjacent the first header and the second header and operable to selectively isolate each flow meter from the first header and the second header, a mobile platform on which the manifold is mounted, the platform including access to the ports of the first header and second header, and a flow computer in communication with each flow meter and configured to receive signals from each flow meter and to determine a desired process value from measurement variables determined by each flow meter.

The transfer standard apparatus has a systemic mass uncertainty that does not exceed +/−0.05% and a systemic density uncertainty that does not exceed 0.2 kilograms per cubic meter. The measurement variables to be determined by the two or more flow meters are selected from a plurality of measurement parameters, including volume, mass, density and viscosity.

In an embodiment, the two or more flow meters are Coriolis flow meters. In a further embodiment, the flow capacity of a first flow meter is less than half the flow capacity of the other flow meters and/or at least two of the flow meters have the same flow capacity. In certain embodiments, the flow capacities of the two or more flow meters are selected to enable a turndown ratio of 100 to 1 or 200 to 1.

In certain embodiments, the apparatus further includes a data acquisition system in communication with each flow meter and configured to record the measurement variables determined by each flow meter, the flow computer is in communication with a server via a network, and/or an energy storage device. In another embodiment, each of the two or more flow meters includes a transmitter in communication with the flow computer. In yet another embodiment, each transmitter is further in communication with the data acquisition system.

In further embodiments, the mobile platform includes a test compartment substantially containing the manifold and a control compartment including the flow computer. In certain embodiments, each flow line further includes a pressure sensor and a temperature sensor disposed upstream of each flow meter, each pressure sensor and temperature sensor in communication with the flow computer. In certain embodiments, the apparatus further includes a valve controller in communication with, and configure to control, at least one of the valves disposed in the flow lines adjacent the first header and the second header. In at least one embodiment, the apparatus further includes a diverter flow line in fluid communication with at least two of the two or more flow lines and connected to each corresponding flow line by a multi-way valve at each end of the diverter flow line, the multi-way valve structured to selectively divert flow from one flow line to the other flow line via the diverter flow line such that the flow meters of the corresponding flow lines are fluidly connected in series. In such an embodiment, the diverter flow line includes a pressure sensor in communication with the flow computer.

DETAILED DESCRIPTION

The present application discloses various embodiments of a transfer standard apparatus and system for in situ calibration of measuring devices and methods for using and constructing the same. The disclosed transfer standard system enables measuring devices (i.e., equipment under test (EUT)), such as flow or level meters, to be calibrated in-process (i.e., in situ) using the medium the measuring device is intended to measure. For example, the transfer standard apparatus enables a flow meter to be calibrated using fluid from the same process in which the flow meter is employed instead of using on a different calibrating fluid, which introduces uncertainty in subsequent in-process measurements of the medium. Further, environmental influences such as temperature and pressure are corrected and compensated for to ensure that the systemic mass uncertainty does not exceed a certified value of +/−0.05%, and the systemic density uncertainty does not exceed 0.2 kilograms per cubic meter (kg/m$^3$). According to one aspect of the present disclosure, a mobile platform including the transfer standard system is disclosed to facilitate transportation of the transfer standard system to the location of the measuring device to be calibrated.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. For example, the present disclosure provides exemplary embodiments with flow meters; however, other types of measuring devices could be used.

Figure 1:
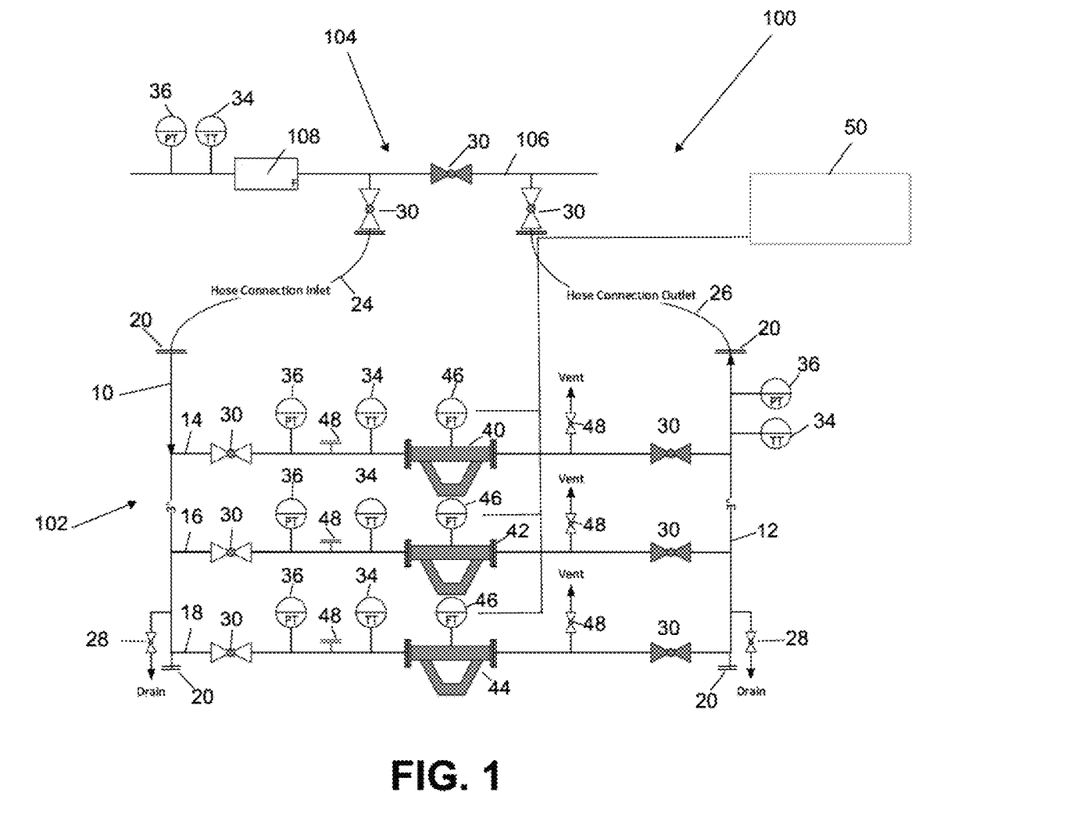
FIG. 1 shows a schematic diagram of a transfer standard system according to an embodiment of the present disclosure.

FIG. 1 shows a transfer standard system 100 according to an embodiment of the present disclosure. The system 100 includes a manifold 102 including a first header 10 and a second header 12, each header 10, 12 having ports 20 at each end. The manifold 102 includes multiple fluid flow lines arranged in parallel to one another connecting the first header 10 to the second header 12. As shown in FIG. 1, the manifold 102 may include a first flow line 14, a second flow line 16 and a third flow line 18. In alternative, embodiments the manifold 102 may include more than three flow lines in parallel between the first header 10 and the second header 12. Each of the first, second and third flow lines 14, 16, 18 may include a flow meter in fluid communication between the first header 10 and the second header 12. Each of the first, second and third flow lines 14, 16, 18 may be pipes, tubes, hoses, conduits or the like, suitable to convey a medium to be measured, such as a fluid, at a desired temperature and pressure. The first, second and third flow lines 14, 16, 18 may be connected to the first and second headers 10, 12 by any suitable means, including but not limited to welding, adhesive or mechanical coupling, such as a process connection including seals and a mechanical fasteners.

As shown in the exemplary embodiment of FIG. 1, the manifold 102 may include a first flow meter 40 in line with the first flow line 14, a second flow meter 42 in line with the second flow line 16 and a third flow meter 44 in line with the third flow line 18. The flow meters 40, 42, 44 may be any suitable flow meter. In at least one embodiment of the present disclosure, the first flow meter 40, the second flow meter 42 and the third flow meter 44 may be Coriolis meters (i.e., inertial flow meters) operable to measure the mass flow rate of fluids, such as water, acids, chemicals and gases. In certain embodiments, the first flow meter 40, second flow meter 42 and third flow meter 44 may be structured to measure liquid and/or gaseous hydrocarbons, such as crude oil, natural gas and liquid natural gas, which have a relatively wide range of densities and viscosities. Each of the first, second and third flow lines 14, 16, 18 and the first and second headers 10, 12 may be sized according to the flow capacities of the flow meters 40, 42, 44 such that each flow line 14, 16, 18 has adequate flow capacity to both prevent choking of the flow through the manifold 102 and maintain adequate pressure in the manifold 102. In an exemplary embodiment, the first and second headers 10, 12 may have inner diameters of around 10 centimeter (about 4 inches) and the first, second and third flow lines 14, 16, 18 may have small inner diameters. In certain embodiments, the manifold 102, including the first, second and third flow lines 14, 16, 18, the first and second headers 10, 12, the valves 30 and the connections therebetween, may be constructed to limit the pressure drop across the manifold 102 to a desired limit, for example, no more than approximately 110 kilopascals (kPa).

Each of the first, second and third flow lines 14, 16, 18 may further include one or more valves 30, enabling each flow meter 40, 42, 44 to be selectively isolated from the remainder of the manifold 102. The valves 30 may be disposed adjacent each of the first and second headers 10, 12 at both ends of the flow lines 14, 16, 18. The valves 30 may be any suitable valve type capable of selectively blocking fluid flow, including without limitation two-way, three-way or multi-way isolation, block or bleed valves. In certain embodiments, combinations of different valve types may be used. For example, the valves 30 adjacent the first header 10 may be isolation valves, and the valves 30 adjacent the second header 12 may be combination double block and bleed valves. Drain valves 28 may be connected to the first header 10 and the second header 12. The drain valves 28 may be isolation valves opened selectively to drain fluid from the first header 10 and/or the second header 12.

Each of the first, second and third flow lines 14, 16, 18 may further include one or more vents 48 to selectively, or automatically under over-pressure conditions, relive pressure from the headers 10, 12 and/or flow lines 14, 16, 18 of the manifold 102. In at least one embodiment, each flow line 14, 16, 18 may include over-pressure relief disc vent 48 and/or an isolation valve vent 48, as shown in FIG. 1. Each of the first, second and third flow lines 14, 16, 18 may further include a pressure sensor 36 and a temperature sensor 34 to monitor the flow conditions within each corresponding flow line 14, 16, 18. In certain embodiments, the first header 10 and/or the second header 12 may further include a pressure sensor 36 and a temperature sensor 34.

The first flow meter 40, the second flow meter 42 and the third flow meter 44 may have flow capacities in a desired operating range, selected relative to the operating range of the EUT. In certain embodiments, the flow meters 40, 42, 44 may have mass flow capacities (i.e., operating ranges) between 0 kilograms per hour (kg/h) and about 4,100,000 kg/h. Alternatively, the flow meters 40, 42, 44 may have mass flow capacities between 0 kg/h and about 800,000 kg/h. In a further alternative embodiment, the flow meters 40, 42, 44 may have mass flow capacities between 0 kg/h and about 180,000 kg/h or lower. In an exemplary embodiment, the flow meters 40, 42, 44 may have maximum mass flow capacities between about 5000 kg/h and about 140,000 kg/h. The flow capacities of such meters are at least partially dependent upon the pressure in the meter. In certain embodiments, the pressure in the system 100 may be limited, for example, to about 70 kPa.

In addition to the maximum flow capacity, each of the flow meters 40, 42, 44 may be selected according to its nominal flow capacity, which may be selected relative to the operating range of the EUT. In at least one embodiment, the first flow meter 40 may have a lesser flow capacity than the second flow meter 42 and third flow meter 44, for example, less than half of the flow capacity of the second flow meter 42 and/or third flow meter 44. In such an embodiment, the second flow meter 42 and the third flow meter 44 may have the same flow capacity. In an exemplary embodiment, the first flow meter 40 may have a nominal flow capacity of about 700-15,000 kg/h and the second flow meter 42 and third flow meter 44 may have nominal flow capacities of about 3,500-60,000 kg/h. In a further exemplary embodiment, the first flow meter 40 may have a nominal flow capacity of about 3,500-60,000 kg/h and the second flow meter 42 and third flow meter 44 may have nominal flow capacities of about 25,000-400,000 kg/h. In an alternative embodiment, each of the first, second and third flow meters 40, 42, 44 may have different flow capacities, which may be higher or lower than the exemplary flow capacities detailed herein. By including flow meters of differing flow capacities, the flow meters 40, 42, 44 may be selected such that the system 100 has a turndown ratio of nearly 200 to 1 or 100 to 1, as desired, while yielding systemic uncertainties low enough to meet industry standards.

The valves 30 adjacent the first header 10 and second header 12 enable the first, second and third flow meters 40, 42, 44 to be selectively isolated or included in the flow through the manifold 102, which enables the system 100 to calibrate and certify measuring devices (i.e., EUT) over a wide operating range by selectively routing the process fluid through the first flow meter 40, second flow meter 42 and/or third flow meter 43. The selective isolation/inclusion of the flow meters 40, 42, 44 enables the total flow through the manifold 102 and, thereby, the desired operating range of the system 100 to be adjusted, enabling the system 100 to be adapted to an calibration range of the EUT. For example, to calibrate an EUT having a relative low flow capacity, the valves 30 may be actuate such that only one of the first flow meter 40 is in fluid communication with the first header 10 and second header 12 and, thus, all of the total flow through the manifold 102 is routed through the first flow meter 40, which may have a relatively low flow operating range in which it is most accurate (i.e., least uncertainty). As a further example, to calibrate an EUT having a relative high flow capacity, the valves 30 may be actuate such that all of the first, second and third flow meters 40, 42, 44 are in fluid communication with the first header 10 and second header 12 and, thus, the total flow through the manifold 102 is split and routed through the each flow meter 40, 42, 44, which when combined may have a flow operating range sufficient for the EUT while reducing uncertainty. Thus, the system 100 enables the flow meters 40, 42, 44 to be selectively included in a desired calibration configuration that is adapted to the operating range (e.g., flow capacity) of the EUT and provides multiple metering streams that enable the system 100 to achieve systemic uncertainties of less than that of a conventional single stream reference standard.

The first, second and third flow meters 40, 42, 44 may be selected to yield a desired system operating range, which may be the flow capacity range for which the system 100 can be used to calibrate the EUT to a desired uncertainty (i.e., accuracy). For example, in an embodiment, the first flow meter 40 may have a relatively low flow capacity, defining a lower end of the system operating range, and the second/or and third flow meters 42, 44 may be selected to yield a significantly greater upper end of the system operating range, which may be significantly greater than the maximum flow capacity of the first flow meter 40. In at least one embodiment, the desired operating range of the system 100 may be 700-135,000 kg/h. In an alternative embodiment, the desired operating range of the system 100 may be 3,500-860,000 kg/h. In an alternative embodiment, the first, second and third flow meters 40, 42, 44 may be selected such that the desired system operating range may be higher or lower than the exemplary ranges detailed herein. Further, the operating range is at least partially dependent upon the medium measured in the system 100. Because the system 100 enables calibration/certification in situ, the system 100 enables calibration/certification of the EUT using the target medium, thereby lowering the uncertainty further.

The desired uncertainty may be an industry standard set to qualify a system as a field transfer standard by a recognized standards organization, such as the International Organization of Legal Metrology (OIML), the National Institute of Standards and Technology (NIST), the American Petroleum Institute (API) or any of various national measurement institutes, such as the Netherlands Measurement Institute (NMi). For example, under at least one recognized standard, the maximum mass uncertainty to certify the EUT may be +/−0.05%, and the density uncertainty may not exceed 0.2 kg/m$^3$. The first, second and third flow meters 40, 42, 44 may be selected to yield a maximum systemic mass uncertainty for the system 100 of +/−0.05%, and a systemic density uncertainty not exceeding 0.2 kg/m$^3$ across the entire desired system operating range. Alternatively, the first, second and third flow meters 40, 42, 44 may be selected to yield a systemic maximum mass uncertainty for the system 100 of +/−0.05%, and a systemic density uncertainty not exceeding 0.2 kg/m$^3$ across a target operating range, which may be narrower than the desired system operating range.

The systemic uncertainty of the system 100 is at least partially dependent upon the propagation of uncertainties, including a balance determination of the weight/mass, flow repeatability, and temperature, pressure and density variations. The system 100 is capable of providing the maximum systemic mass and density uncertainty over a wide temperature range and regardless of whether the medium is a liquid or gas. For example, the system 100 may provide the maximum systemic mass and density uncertainty over a range of around −200° C. (approximately the temperature at which liquid natural gas may be transferred) to more than +200° C. (an exemplary temperature at which hot oil may be transferred).

In embodiments in which the first, second and third flow meters 40, 42, 44 are Coriolis meters having enhanced metering accuracy, environmental influences of the process conditions, such as temperature and pressure, are corrected and compensated for to ensure that the systemic mass uncertainty does not exceed a certified value of +/−0.05%, and the density uncertainty does not exceed 0.2 kilograms per cubic meter (kg/m$^3$). Such Coriolis flow meters are manufactured by Endress+Hauser AG.

In at least one embodiment, the flow meters 40, 42, 44 are multi-frequency mode flow meters operable to determine a viscosity of the fluid to be measured, which can improve the accuracy of the determination of the density of the fluid to be measured. The flow meters 40, 42, 44 may further enable temperature and pressure compensation by using measurement signals from the pressure sensors 36 and temperature sensors 34. In such an embodiment, the measurement signals from the pressure sensors 36 and temperature sensors 34 are transmitted to a flow computer 50, which adjusts the measurement signals from the flow meters 40, 42, 44 to improve the accuracy of the determination of the density of the fluid to be measured, which further improves the accuracy of the determination of the volumetric flow rate of the fluid to be measured. Use of measurement signals from the pressure sensors 36 and temperature sensors 34 makes the determination of the mass flow rate of the fluid relatively insensitive to temperature variation from standard conditions (i.e., base conditions) and further minimizes the effect of the Reynolds number of the fluid flow, which is an aspect of and is influenced by the viscosity and velocity of the fluid. Alternatively, an external temperature measurement using an external temperature sensor (not shown) may be provided to the flow computer 50 for adjustment of the measurement signals from the flow meters 40, 42, 44.

The system 100 may further include the flow computer 50 in communication with at least the flow meters 40, 42, 44, pressure sensors 36 and temperature sensors 34 of the manifold 102. Each flow meter 40, 42, 44 may further include a flow transmitter 46 capable of communicating the measurements of its corresponding flow meter 40, 42, 44, for example, to the flow computer 50 or a data acquisition system as described further herein. For example, as shown in FIG. 1, the flow computer 50 may be in communication with each transmitter 46 of the first flow meter 40, second flow meter 42, third flow meter 44, temperature sensors 34 and pressure sensors 36. The flow computer 50 may be in communication with the first flow meter 40, the second flow meter 42 and the third flow meter 44 directly. Alternatively, each flow transmitter 46 of the flow meters 40, 42, 44 may communicate the measurements of its corresponding flow meter 40, 42, 44 to the flow computer 50 or a data acquisition system as described further herein.

The flow computer 50 may include a processor, real time clock and memory and be configured to receive measurement signals from the flow meters 40, 42, 44 (via the transmitter 46 in certain embodiments) and to determine a desired measurement variable selected from a plurality of measurement parameters, including volume, mass, density and viscosity, from the measurement signals. The flow computer 50 may execute preprogrammed algorithms using the measurement signals received from flow meters 40, 42, 44, temperature sensors 34 and/or pressure sensors 36 into volumetric flow rates at base conditions (i.e., standard temperature and pressure). In certain embodiments, flow meters 40, 42, 44 may enable the flow computer 50 to correct for the effects of Reynolds number (i.e., Reynolds number correction) on the measurement variable using the measurement signals received from flow meters 40, 42, 44, temperature sensors 34 and/or pressure sensors 36.

The flow computer 50 may record events and activate alarms related to the flow conditions reported by the flow meters 40, 42, 44 (for example, loss of flow, loss of required measurement signals, or transition of the measurement signals beyond a predetermined range). The flow computer 50 may further record measurements signals and/or the determined measurement variable over time and provide the recorded data externally through an interface. In certain embodiments, the flow computer 50 may include a programmable logic controller with an input/output interface, a calculating device and a reporting device. The flow computer 50 is capable of generating reports, either electronic or hardcopy, to provide documentation for the calibration and/or certification of the EUT.

The system 100 may include a power source (not shown). In certain embodiments, the power source may be a power storage device, such as a battery, to enable the system 100 to operate without external power. In alternative embodiments, the power source may be an external power source. Alternatively, the power source may include both a power storage device and an external power source. In such an embodiment, the power storage device may service as a backup power source.

The system 100 may be connected to a process 104 by an inflow line 24 and an outflow line 26 at ports 20 of the first header 10 and second header 20, respectively. The process 104 includes a process conduit 106, to which the inflow line 24 and the outflow line 26 are connected. The process conduit 106 may be separated from the manifold 102 by valves 30 adjacent the connections to the inflow line 24 and the outflow line 26. The process conduit 106 may include a blocking valve 30 disposed between the connections to the inflow line 24 and the outflow line 26 to facilitate connection to the system 100. The process conduit 106 may further include a pressure sensor 36 and a temperature sensor 34 located to monitor the process 104 and specifically the conditions within the process conduit 106.

The system 100 may be connected to a process 104 such that the fluid to be measured from the process 104 (i.e., the process fluid) may be routed from the process conduit 106 into the first header 10 via the inflow line 24 by closing the valve 30 of the process conduit 106 located between the inflow line 24 and the outflow line 26 and opening the valves 30 between the process conduit 106 and the inflow line 24 and the outflow line 26. After passing through the manifold 102 and the second header 12, the process fluid may be routed back to the process conduit 106 via the outflow line 26. In certain applications, the flow from the process conduit 106 may be routed into the second header 12 via the outflow line 26 through the manifold 102 and returned to the process conduit 106 via the first header 10 and the inflow line 24. Thus, the overall flow direction through the manifold 102 may be defined by which of the inflow or outflow lines 24, 26 accepts process flow from the process conduit 106 and which returns the flow to the process conduit 106.

The system 100 enables the calibration and certification of a process flow meter 108 (i.e., the EUT) employed in the process 104 by determining of the flow conditions in the process conduit 106 using the flow meters 40, 42, 44 of the manifold 102 and comparing that determination to the measurements of the process flow meter 108. The system 100 enables the calibration and certification of various measuring devices, including but not limited to Coriolis mass, positive displacement, turbine, vortex, magnetic, ultrasonic and differential pressure devices. The system 100 further enables the calibration and certification of ultrasonic devices, which conventionally require ball provers or master meters due to the large volume displacement over time required to certify ultrasonic devices.

Figure 2:
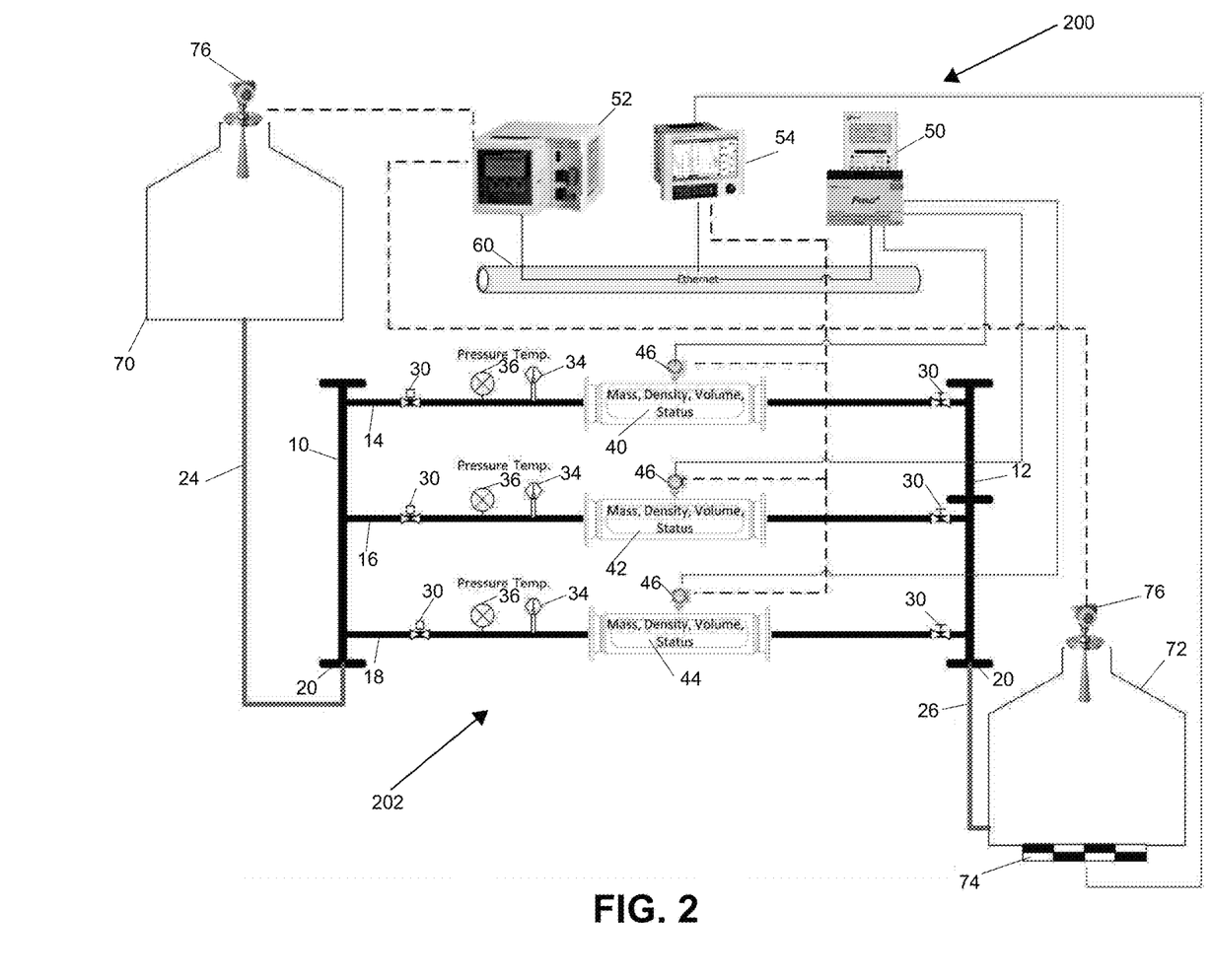
FIG. 2 shows a schematic diagram a transfer standard system according to an embodiment of the present disclosure applied to a hydrostatic tank gauging system.

The system 100 further may be embodied to calibrate level meters and hydro static tank gauging systems. FIG. 2 shows a transfer standard system 200 according to an embodiment of the present disclosure applied to calibrate a level meters in a storage tank system. As shown in FIG. 2, the system 200 includes a manifold 202 including the first flow meter 40, the second flow meter 42 and the third flow meter 44 disposed in parallel between the first header 10 and second header 12 along the first, second and third flow lines 14, 16, 18, respectively, as described with respect to the system 100. A port 20 of the first header 10 is connected to a first (i.e., supply) tank 70 via the inflow line 24, and a port 20 of the second header 12 is connected to a second (i.e., receiving) tank 72. The supply tank 70 and receiving tank 72 each include a measuring device 76 capable of registering a quantity of a medium (not shown) contained within the first and second tanks 70, 72. The measuring devices 76 may be level meters configured to register the level of the medium in the first and second tanks 70, 72 and, given the dimensions and temperature of the tanks 70, 72, thereby the quantity of the medium in the first and second tanks 70, 72. In an alternative application, the measuring device 76 may be a hydrostatic tank gauging system including at least two pressure sensors and a temperature sensor to enable the determination of mass, density, volume and level of the medium. The second tank 72 may be positioned on a gravimetric reference 74 (i.e., tank gauging scale) to provide a secondary mass measurement of the medium transferred from the first tank 70 to the second tank 72 via the system 200.

The transfer standard system 200 may further include a data transmitting, acquisition and control subsystem. In at least one embodiment, as shown in FIG. 2, the system 200 may include a data transmitter 52 in communication with the measuring devices 76 and a network 60. The system 200 may include a data acquisition device 54 in communication with the first, second and third flow meters 40, 42, 44 and/or with the network 60. Specifically, the data acquisition device 54 may be in communication with flow transmitters 46 (in shown in FIG. 2) associated with the first, second and third flow meters 40, 42, 44. The pressure sensors 36 and temperature sensors 34 may be in communication with data acquisition device 54 either directly or via the network 60. The data acquisition device 54 is capable of data acquisition functions, such as data recording, visualization and signal analysis. An example of one such device is the Memograph® M RSG45 manufactured by Endress+Hauser AG.

The system 200 may further include the flow computer 50 in communication with the first, second and third flow meters 40, 42, 44 and with the network 60. The flow computer 50 may further be in communication with the valves 30 of the manifold 202. The flow computer 50 may be configured to control the operation of the system 200, including the first, second and third flow meters 40, 42, 44 and the valves 30.

Communications between the data transmitter 52, data acquisition recorder 54, flow computer 50 and the network 60 may be via any suitable means, including but not limited to a wireless protocol, such as Bluetooth® or ZigBee®, or a wired connection, such as Modbus or Ethernet using the Highway Addressable Remote Transducer (HART) communication protocol or other suitable process automation protocol.

The system 200 enables the certification and calibration of storage tanks, their associated equipment and level measuring devices, such as free-space radar, guided radar, ultrasonic, capacitance, radiometric and hydrostatic level measuring devices, by comparing the measurement signals of the measuring devices 76 to the measurement variable determined by the flow computer 50 using the measurement signals from the first flow meter 40, second flow meter 42 and third flow meter 44.

Figure 3:
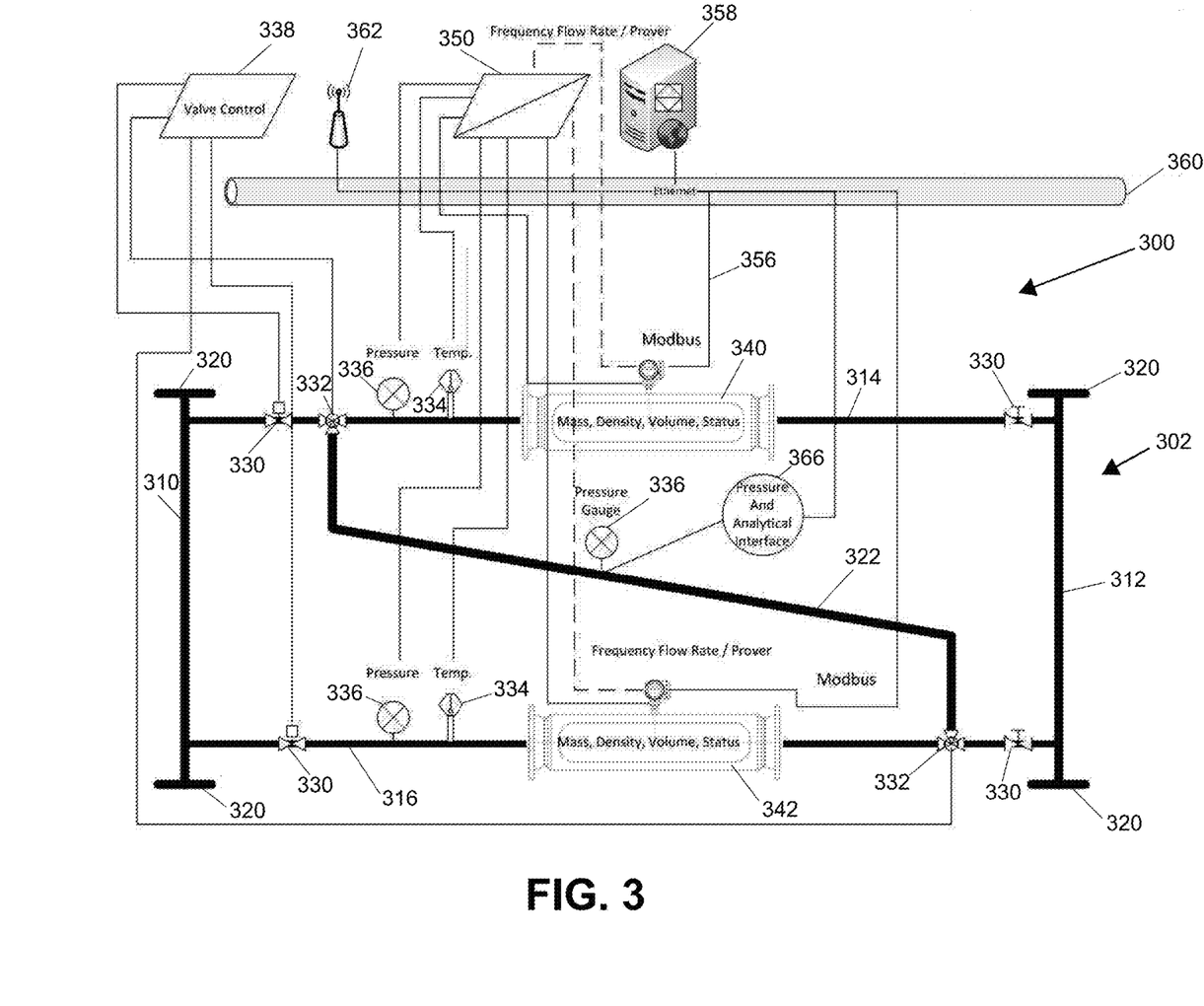
FIG. 3 a schematic diagram a transfer standard system according to an alternative embodiment of the present disclosure.

According to a further embodiment of the present disclosure, a transfer standard system 300 includes two flow meters in a Z-arrangement. As shown in FIG. 3, the system 300 includes a manifold 302 including a first header 310 and a second header 312, each having ports 320 at each end. The manifold 302 may include multiple fluid flow lines arranged in parallel to one another connecting the first header 310 to the second header 312 and at least one diverter flow line 322 connecting two or more flow lines. In at least one embodiment, as shown in FIG. 3, the manifold 302 may include a first flow line 314, a second flow line 316 and the diverter flow line 322 connecting the first flow line 314 and the second flow line 316 between the first and second headers 310, 312. The manifold 302 further includes a first flow meter 340 in line with the first flow line 314 and a second flow meter 342 in line with the second flow line 316. The first flow line 314 and second flow line 316 may each include valves 330 disposed adjacent each of the first and second headers 310, 312. The first flow line 314 and second flow line 316 may each further include pressure sensors 336 and temperature sensors 334. In certain embodiments, the system 300 may include additional flow lines between the first header 310 and second header 312 that are not connected to the diverter line 322.

The diverter flow line 322 intersects the first flow line 314 on one side of the first flow meter 340 (i.e., either upstream or downstream, depending on the overall flow direction through the manifold 302) via a diverter valve 332 and intersects the second flow line 316 on an opposing side of the second flow meter 342 relative to the first flow meter 340 (i.e., either downstream or upstream, respectively) via another diverter valve 332. The diverter valves 332 may be three-way valves or multi-way valves. The diverter flow line 322 may include a pressure sensor 336 to monitor to the pressure in the diverter flow line 322 independent of the pressure sensors 336 of the first and second flow lines 314, 316. The diverter flow line 322 may further include an analytic interface 366 configured to process data from the pressure sensor 336 and communicate via the network 360.

The diverter flow line 322 enables the system 300 to operate in multiple modes. In a parallel mode, the first flow meter 340 and second flow meter 342 may be fluidly connected in parallel, similar to system 100 and system 200, by adjusting the diverter valves 332 to direct flow from the first header 310 through the first and second flow meters 340, 342 to the second header 312 or alternatively, from the second header 312 through the first and second flow meters 340, 342 to the first header 310. In a series mode, the diverter flow line 322 enables the first flow meter 340 to be fluidly connected in series with the second flow meter 342 using the diverter valves 332 to direct flow through the diverter flow line 322 and using the valves 330 to isolate either the first flow meter 340 or second flow meter 342 from the first header 310 or the second header 312 as desired, thereby directing flow from one header 10, 12, through both flow meters 340, 342 in series via the diverter flow line 322, and to the other header 10, 12.

For example, where the inflow into the manifold 302 comes into the first header 310, the first flow meter 340 may be set in series with the second flow meter 342 by closing both the valve 330 upstream of the first flow meter 340 and the valve 330 downstream of the second flow meter 342, by adjusting the diverter valve 332 of the second flow line 316 to direct flow downstream of the second low meter 342 from the second flow line 316 into the diverter flow line 322 and by adjusting the diverter valve 332 of the first flow line 314 to direct flow from the diverter flow line 322 into the first flow line 314 upstream of the first low meter 340, the flow then exiting the manifold 302 via a port 220 of the second header 312. Alternatively, where the inflow into the manifold 302 comes into the second header 312, the first flow meter 340 may be set in series with the second flow meter 342 by closing both the valve 330 downstream of the first flow meter 340 and the valve 330 upstream of the second flow meter 342, by adjusting the diverter valve 332 of the first flow line 314 to direct flow downstream of the first low meter 340 from the first flow line 314 into the diverter flow line 322 and by adjusting the diverter valve 332 of the second flow line 316 to direct flow from the diverter flow line 322 into the second flow line 316 upstream of the second low meter 342, the flow then exiting the manifold 302 via a port 220 of the first header 310.

In the series operating mode, the system 300 may be used to check the accuracy of the first flow meter 340 against the second flow meter 342 or vice versa. Alternatively, in the series operating mode, the system 300 may be used for calibrating the EUT having a relatively low flow capacity, for instance, at or near the low end of the operating range of the first flow meter 340 or the second flow meter 342. In such an embodiment, the first flow meter 340, the second flow meter 342 or both may be used as the standard for the EUT.

In an embodiment according to the present disclosure, the system 300 may include a flow computer 350 in communication with the first flow meter 340, second flow meter 342, pressure sensors 336 and temperature sensors 334, all of which may further communicate with a server 358 via a network 360. The communications may be carried by communication lines 356, as shown in FIG. 3. In certain embodiments, the system 300 may include an antenna 362 to enable wireless communication between the various components of the system 300 (e.g., flow meters 340, 342, pressure sensors 336 and temperatures sensors 334) and the network 360. The system 300 may further include a valve controller 338 configured to generate signals to actuate the valves 330 and diverter valves 332.

Figure 4:
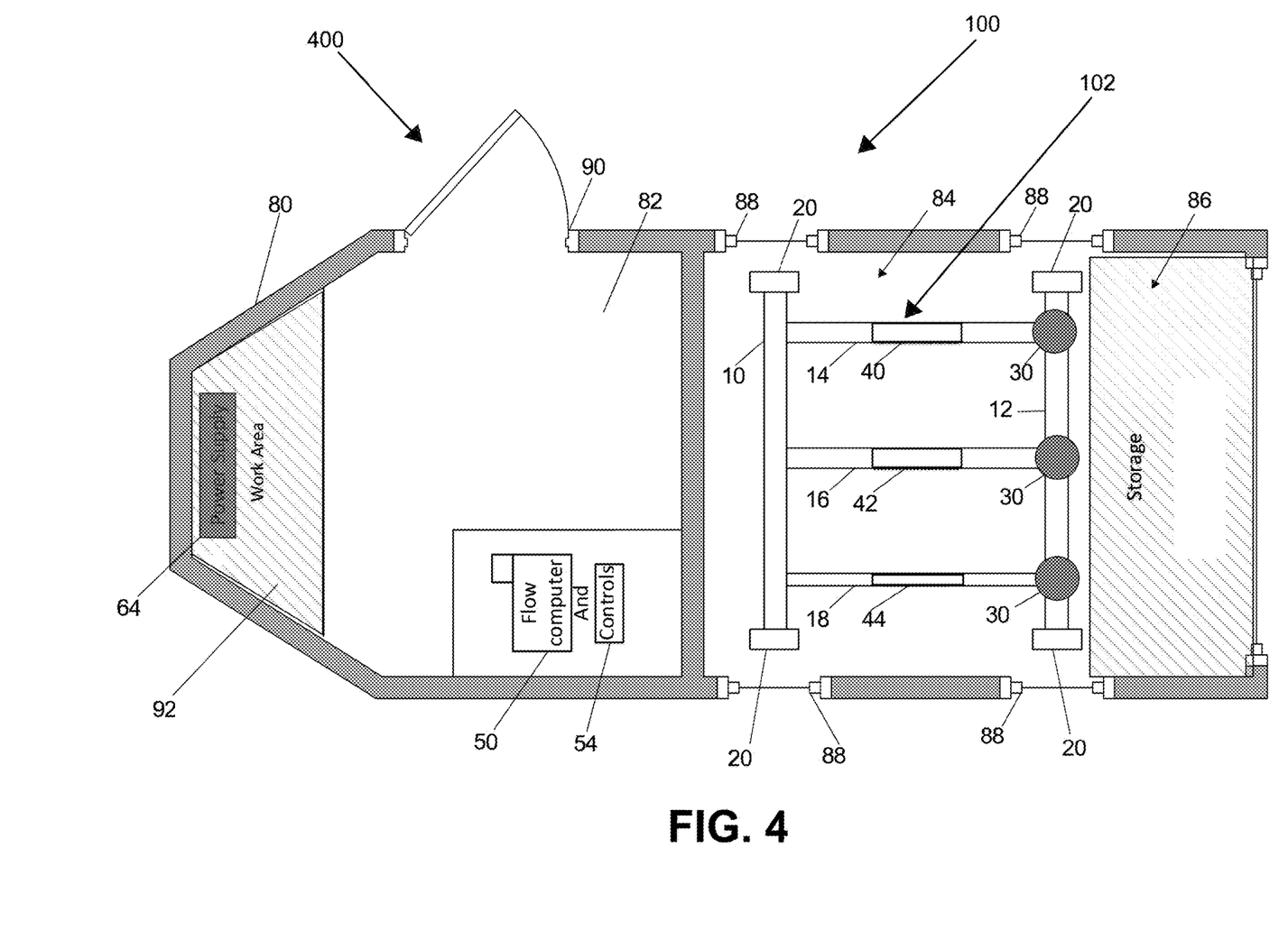
FIG. 4 shows a plan view of a mobile platform including the transfer standard system of FIG. 1 according to an embodiment of the present disclosure.

According to a further embodiment of the present disclosure, the transfer standard system 100 may be applied to a mobile platform 400. As shown in FIG. 4, the mobile platform 400 may include an enclosure 80 having a doorway 90 and multiple compartments. In at least one embodiment, the enclosure 80 may include a control compartment 82, a test compartment 84 and a storage compartment 86. The control compartment 82 may include a work area 92 from which an operator may operate and control the system 100. The control compartment 82 may further include portions of the system 100 such as a power source 64, the flow computer 50, the data acquisition device 54 and other equipment associated with the system 100, such as pressure sensors 36, temperature sensors 34 and the transmitter 52. The test compartment 84 may include multiple access hatches 88 on either side or both sides of the enclosure 80, the access hatches 88 configured and disposed to enable external flow lines to be connected to the ports 20 of the manifold 102. The storage compartment 86 may include flow lines (i.e., hoses, pipes, conduits, etc.), couplings and other suitable equipment to facilitate the connection of external flow lines to the manifold 102 via the ports 20.

For clarity in depicting the mobile platform 400, the manifold 102 of the system 100 has been illustrated in simplified form including the first flow meter 40, second flow meter 42 and third flow meter 44 connected by the first, second and third flow lines 14, 16, 18, via the valves 30, to the first header 10 and second header 12 having ports 20 at their ends. In certain embodiments, each port 20 may include a blind flange to enable connecting external flow lines to the first and second headers 10, 12. The mobile platform 400 may include additional embodiments of the system 100 as described in detail herein or may include embodiments of the system 200 or the system 300.

The mobile platform 400 enables an operator to calibrate the EUT in situ (i.e., in-process) without removing the EUT from the process in which it is deployed, saving significant time and reducing costs compared to conventional calibration/certification methods. The mobile platform 400 enables an operator to transport the transfer standard system 100 to the location of the EUT and connect the system 100 directly to the process using external lines via the ports 20. Once connected to the process, process flow can be routed through the system 100 as described herein to calibrate and certify the EUT in situ using the process fluid directly from the process, instead of using on a different calibrating fluid. The operator can control and monitor the calibration and/or certification process from the control compartment 82.

The mobile platform 400 reduces the uncertainty introduced by conventional calibration techniques, which use standard fluids for calibration under laboratory conditions, by enabling the use of the process fluid under process conditions. The first, second and third flow meters 40, 42, 44 are configured to correct and compensate for environmental influences of the process conditions, such as temperature and pressure, to ensure that the systemic mass uncertainty does not exceed a certified value of +/−0.05%, and the systemic density uncertainty does not exceed 0.2 kilograms per cubic meter ($kg/m^3$). The system 100 and the mobile platform 400 enable the calibration and certification of measuring devices using liquid and/or gaseous hydrocarbons, such as crude oil, natural gas and liquid natural gas, which have a relatively wide range of densities and viscosities and are transferred over a wide range of temperatures, while providing the systemic uncertainties defined herein.

While various embodiments of a transfer standard system and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

The invention claimed is:

1. A transfer standard apparatus for in situ calibration of measuring devices, the apparatus comprising:
   a manifold comprising:
      a first header in fluid communication with a second header via three or more flow lines, the first header and the second header each having ports at each end, the ports structured to enable external flow lines to be connected to the first header and the second header, wherein at least one port of each of the first header and second header is configured to be connected via the external flow lines to external ports of a remote industrial process in which a measuring device to be calibrated is deployed, wherein the at least one port of each of the first header and second header is configured to be connected such that the manifold forms a fluid circuit with the remote industrial process as to enable in situ calibration of the measuring device using a process fluid operated upon by the remote industrial process;

three or more flow meters, each having a flow capacity and disposed in one of the three or more flow lines such that the flow meters are connected in parallel relative to the first header and second header, wherein each of the flow meters has the same flow capacity as the other flow meters, wherein each flow meter is a Coriolis flow meter; and valves disposed in the flow lines adjacent the first header and the second header and operable to selectively isolate each flow meter from the first header and the second header;

a mobile platform on which the manifold is mounted, the platform including access to the ports of the first header and second header; and a flow computer in communication with each flow meter and configured to receive signals from each flow meter and to determine a desired process value from measurement variables determined by each flow meter, wherein the flow computer is further configured to correct the determined process value for changes in Reynolds number calculated from the received signals.

2. The apparatus of claim 1, wherein the flow capacities of the flow meters are selected such that the apparatus has a calibration turndown ratio of 100 to 1.

3. The apparatus of claim 1, wherein the flow capacities of the flow meters are selected such that the apparatus has a calibration turndown ratio of 200 to 1.

4. The apparatus of claim 1, wherein the flow meters are selected such that a systemic mass uncertainty of the apparatus does not exceed +/−0.05%.

5. The apparatus of claim 1, wherein the flow meters are selected such that a systemic density uncertainty of the apparatus does not exceed 0.2 kilograms per cubic meter.

6. The apparatus of claim 1, wherein the measurement variables to be determined by the flow meters are selected from a plurality of measurement parameters.

7. The apparatus of claim 6, wherein the measurement parameters include volume, mass, density and viscosity.

8. The apparatus of claim 1, the apparatus further comprising a data acquisition system in communication with each flow meter and configured to record the measurement variables determined by each flow meter.

9. The apparatus of claim 1, wherein the flow computer is in communication with a server via a network.

10. The apparatus of claim 1, wherein the mobile platform includes a test compartment substantially containing the manifold and a control compartment including the flow computer.

11. The apparatus of claim 1, the apparatus further comprising an energy storage device.

12. The apparatus of claim 1, wherein each of the flow meters includes a transmitter in communication with the flow computer.

13. The apparatus of claim 12, wherein each transmitter is further in communication with the data acquisition system.

14. The apparatus of claim 1, wherein each flow line further includes a pressure sensor and a temperature sensor disposed upstream of each flow meter, each pressure sensor and temperature sensor in communication with the flow computer.

15. The apparatus of claim 1, the apparatus further comprising a valve controller in communication with, and configure to control, at least one of the valves disposed in the flow lines adjacent the first header and the second header.

16. The apparatus of claim 1, the apparatus further comprising a diverter flow line in fluid communication with at least two of the three or more flow lines and connected to each corresponding flow line by a multi-way valve at each end of the diverter flow line, the multi-way valve structured to selectively divert flow from one flow line to the other flow line via the diverter flow line such that the flow meters of the corresponding flow lines are fluidly connected in series.

17. The apparatus of claim 16, wherein the diverter flow line includes a pressure sensor in communication with the flow computer.

* * * * *